(12) United States Patent
Frendling

(10) Patent No.: US 10,311,531 B2
(45) Date of Patent: Jun. 4, 2019

(54) PROCESS FOR REAL PROPERTY SURVEYS

(71) Applicant: Craig Frendling, Crown Point, IN (US)

(72) Inventor: Craig Frendling, Crown Point, IN (US)

( * ) Notice: Subject to any disclaimer, the term of this patent is extended or adjusted under 35 U.S.C. 154(b) by 661 days.

(21) Appl. No.: 14/742,623

(22) Filed: Jun. 17, 2015

(65) Prior Publication Data

US 2015/0371346 A1 Dec. 24, 2015

Related U.S. Application Data

(60) Provisional application No. 62/013,884, filed on Jun. 18, 2014.

(51) Int. Cl.
*G06Q 30/00* (2012.01)
*G06Q 50/16* (2012.01)
*G06Q 30/06* (2012.01)

(52) U.S. Cl.
CPC ......... *G06Q 50/16* (2013.01); *G06Q 30/0641* (2013.01)

(58) Field of Classification Search
CPC ......... G01C 15/00; G06Q 50/16; G06Q 30/00
USPC .................................. 702/150; 705/63 R, 28
See application file for complete search history.

(56) References Cited

U.S. PATENT DOCUMENTS

| 8,442,906 B1 * | 5/2013 | Thomas | G06Q 40/02 705/38 |
| 2001/0045463 A1 * | 11/2001 | Madding | G01N 25/72 235/462.14 |
| 2003/0083819 A1 * | 5/2003 | Rooney | G01V 11/00 702/5 |
| 2003/0130767 A1 * | 7/2003 | Carroll | G01C 11/00 701/3 |
| 2004/0128215 A1 * | 7/2004 | Florance | G06F 17/30241 705/28 |
| 2006/0218005 A1 * | 9/2006 | Villena | G06Q 30/02 705/306 |
| 2008/0140494 A1 * | 6/2008 | Charuk | G06Q 10/10 705/313 |
| 2010/0195439 A1 * | 8/2010 | Muyzert | G01V 1/20 367/56 |
| 2010/0318298 A1 * | 12/2010 | Golparian | G01C 15/00 702/14 |
| 2011/0251876 A1 * | 10/2011 | Fisher | G06Q 10/08 705/7.32 |
| 2012/0166137 A1 * | 6/2012 | Grasser | G01C 15/00 702/150 |
| 2012/0265633 A1 * | 10/2012 | Wohlstadter | G06Q 40/00 705/26.3 |
| 2013/0018585 A1 * | 1/2013 | Zhdanov | G01V 3/083 702/2 |
| 2013/0018588 A1 * | 1/2013 | Zhdanov | G01V 3/08 702/11 |

(Continued)

OTHER PUBLICATIONS http://www.washingtonpost.com/business/on-it/using-drones-to-sell-homes--except-in-washington/2015/02/06/06f69320-a573-11e4-a06b-9df2002b86a0_story.html (last visited Jun. 15, 2015) and http://www.realtor.org/field-guides/field-guide-to-drones-and-real-estate (last visited Jun. 15, 2015).

*Primary Examiner* — Oluseye Iwarere
(74) *Attorney, Agent, or Firm* — Daniel Zamudio

(57) ABSTRACT

An automated machine for surveying real property and a method for using the machine by requesting an automated machine, placing it for surveying the real property, programming the machine and allowing the machine to store and create displayable media.

18 Claims, 3 Drawing Sheets

(56) References Cited

U.S. PATENT DOCUMENTS

| | | | |
|---|---|---|---|
| 2013/0070068 A1* | 3/2013 | Garvey, III | G01C 15/00 348/61 |
| 2014/0132409 A1* | 5/2014 | Billman | G08B 19/00 340/539.1 |
| 2014/0257862 A1* | 9/2014 | Billman | G06Q 40/08 705/4 |
| 2014/0297479 A1* | 10/2014 | McCloskey | G06Q 30/0627 705/26.63 |
| 2015/0052080 A1* | 2/2015 | Letzeiser | G06Q 50/163 705/36 R |
| 2015/0276402 A1* | 10/2015 | Grasser | G01C 15/06 702/150 |
| 2015/0286340 A1* | 10/2015 | Send | G01S 17/46 345/175 |
| 2016/0063635 A1* | 3/2016 | Collazo | G06Q 40/08 705/4 |
| 2016/0131520 A1* | 5/2016 | Martin | G01D 5/35361 73/597 |
| 2016/0148285 A1* | 5/2016 | Kalata | G06Q 30/0278 705/306 |
| 2016/0217578 A1* | 7/2016 | Can | G01V 3/12 |

\* cited by examiner

PROCESS FOR REAL PROPERTY SURVEYS

CROSS-REFERENCE TO RELATED APPLICATIONS

The present application claims the benefit of U.S. Provisional Patent Application No. 62/013,884, filed Jun. 18, 2014, the entirety of which is hereby incorporated by reference.

BACKGROUND

People have been managing, buying, and selling property for centuries. There are traditionally several problems involved with any transfer of property and the process of doing the transaction that is involved with managing, buying, or selling these properties. There is a need in the property industry, particularly relating to real estate, for a solution to solve these problems that have existed for a long time.

People have been managing, buying, and selling farms, homes, commercial property, and vacant land that is to be leased or developed to a third party for years. These transactions usually involve a third party, usually an uninterested party. These third parties can include licensed real estate brokers, inspectors, bankers, insurance agents, surveyors, property managers, and their assistants to name a few examples. In the past several decades homes have surpassed the sale of farms.

Homes tend to have a multitude of characteristics that make them different from one home to the next. This creates one problem that one home is significantly different from another home, each individual property is unique. Learning and describing one home does not simplify the learning and describing of another home. Because of this, the people involved in collecting and presenting the unique characteristics of a home may experience fatigue or may lose their motivation to continue working on mundane tasks.

The involvement of uninterested parties in the sale of property itself creates another problem of making the seller or buyer feel uneasy about having someone peeking inside their home, letting strangers in the home, trusting the managers of property, or not knowing who has been in the home, etc.

Information relevant to attempts to address these problems can be found in public articles such as that presented at http://www.washingtonpost.com/business/on-it/using-drones-to-sell-homes—except-in-washington/2015/02/06/06f69320-a573-11e4-a06b-9df2002b86a0_story.html (last visited Jun. 15, 2015) and http://www.realtor.org/field-guides/field-guide-to-drones-and-real-estate (last visited Jun. 15, 2015). However, each of these references, that were available for review, suffer from one or more of the following disadvantages: 1) they do not provide a process for making a request for an automated machine, 2) the drones require constant human interaction to provide data on the real estate, and the drones are not collecting all possible characteristics of the property being surveyed.

For the foregoing reasons, there is a need in the industry for an apparatus and process that can acquire the characteristics of property being sold, such as a real estate for instance, and convert it to a form that is more readily analyzed by a person, a displayable media. The displayable media can be used for making a model of the property. The model can be used to analyze the characteristics of the property by showing a user those characteristics of the real estate without visiting the real estate. In effect the process would convert the physical home to a modeled version of that home which previously the user did not have available, an interactive electronic presentation for instance. The process should allow for the ease of requesting and inserting an automated machine into a parcel of property so the assistant can "live" in the property and collect data by surveying the property.

Additionally the needed process would make many aspects of transferring property safer for those involved and allow for questions to be asked and answered. The needed process would allow for accurately pinpointing locations of interest to assist with answering questions like "what is this?", "can you fix this?", or "is this included in the sale?"

SUMMARY

My present invention is directed to an apparatus and process that satisfies this need, the utility of which is electronically acquiring environmental characteristics of any property, like real property, via an automated machine being placed in the property by request and converting the characteristics data acquired to a displayable media that can be analyzed. This is the first automated system for collecting data and creating a multimedia presentation of real property, a presentation of a home being sold over the internet to name one example.

I have invented a process for surveying the characteristics of real property, the real property being the subject of a real property transaction, such as a sale or lease to name two examples, the process having features of the present invention comprises the steps of receiving a request from a user for a placement of an automated machine to perform a survey within a real property specimen. The process further comprises receiving a set of data describing the real property specimen and then selecting a property type that applies to the real property specimen as described in the set of data describing the real property specimen. Next is programming the automated machine with at least one parameter related to the property type selected and inserting the automated machine into the real property specimen. Still further the process includes performing a survey of the real property specimen by the automated machine moving about the real property specimen and acquiring surveyed data from the survey via a plurality of sensors, the plurality of sensors providing input to the automated machine. Then recording the surveyed data that is input to the automated machine and converting the surveyed data into a displayable media. This allows for interactively displaying the displayable media.

One embodiment of the present invention would allow the automated machine to determine from the at least one parameter related to the property type whether an item encountered during the survey requires a question be answered by a user. For instance, if the automated machine encounters a water hose lying on the ground it might generate an inquiry to be answered by a user such as "is this hose staying with the property?" The user might note a blinking light on the automated machine, or some other means for noticing the user of a pending question, and then press a button to answer the inquiry through an input device of the automated machine, a microphone to name one example. Similarly, the automated machine might record its acquired data making it available for review by a service provider. The service provider might notice a need for asking the user a question and program that question into the automated machine and have it answered by the user at the next opportunity.

In various embodiments I have invented, receiving the request for a placement could be done over an interconnected communication network. The property type may be selected from one of the following property types: single-family residence, multi-family residence, commercial building, trailer, mobile home, boat, airplane, rental, bank owned property, vacant lot, and new construction. The at least one parameter may be selected from the group consisting of GPS coordinates, floorplan, survey plat, owner name, address, telephone number, reference number, primary key, foreign key, route ID, hours and email. The at least one parameter and the surveyed data may be compared, manually or programmatically by the automated machine, to determine if any surveyed data requires obtaining further data from the user.

In various embodiments I have invented, the automated machine moving about the real property specimen may include following a route, whether it be predetermined or randomly determined. The plurality of sensors may include a camera, microphone, gyroscope, range-finder, distance finder, movement detector or any other similar sensor that measures physical features of the world. The surveyed data may include interior space dimensions, architectural features or other measurable physical characteristics of the real property specimen.

I have also invented an apparatus for surveying the characteristics of real property, the real property being the subject of a real property transaction, which includes a means for receiving a request from a user for a placement of an automated machine to perform a survey within a real property specimen. A means for receiving a set of data describing the real property specimen. A means for selecting a property type that applies to the real property specimen as described in the set of data describing the real property specimen. A means for programming the automated machine with at least one parameter related to the property type selected. A means for inserting the automated machine into the real property specimen. A means for performing a survey of the real property specimen by the automated machine moving about the real property specimen. A means for acquiring surveyed data from the survey via a plurality of sensors, the plurality of sensors providing input to the automated machine. A means for recording the surveyed data that is input to the automated machine. A means for converting the surveyed data into a displayable media and a means for interactively displaying the displayable media.

BRIEF DESCRIPTION OF THE SEVERAL VIEWS OF THE DRAWINGS

These and other features, aspects and advantages of the present invention will become better understood with regard to the following description, appended claims, and accompanying drawings where:

DESCRIPTION

Overview.

Figure 1:
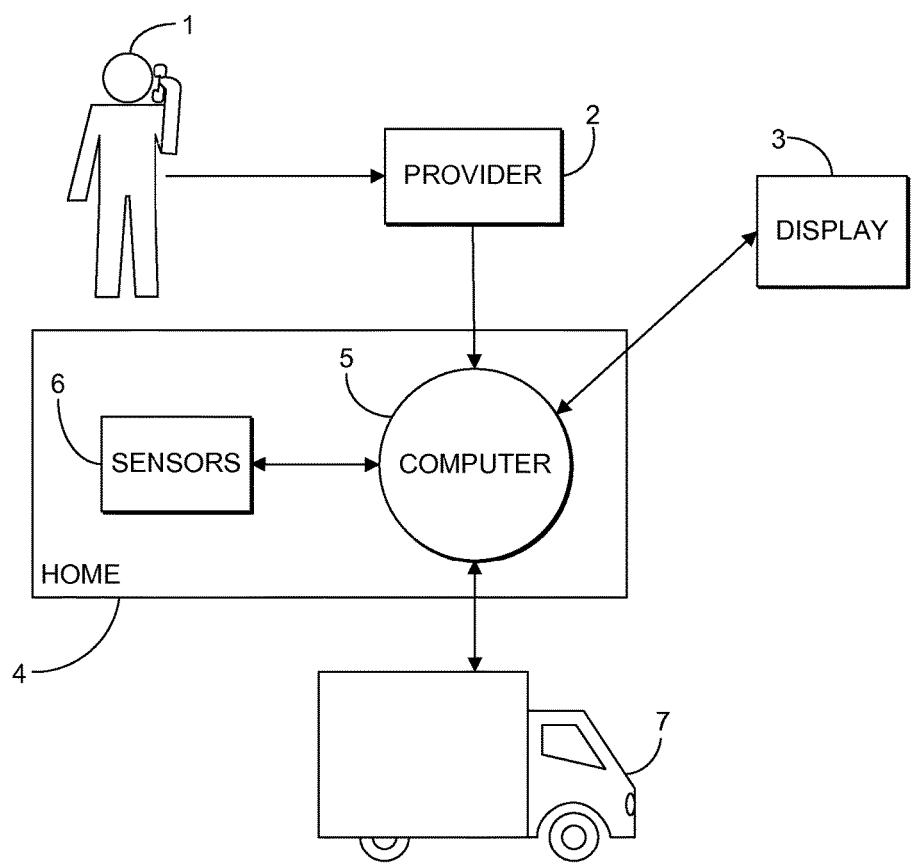
FIG. 1 shows a block diagram of the process of using an automated machine to survey real property.

As shown in FIG. 1, a block diagram of the process of using an automated machine to survey real property comprises a user 1 making a request 1 to a service provider 2. The user 1 provides identifying data to the service provider 2. The service provider receiving the set of data is accomplished best by a person providing information related to the real property specimen by a phone call, computer input, or other mode of communicating. The service provider 2 obtains a computer 5, and programs the computer 5 with identifying data provided by the user 1. What happens here is that the service provider will input certain program parameters into at least one software program loaded on the computer 5, an automated machine.

The service provider 2 makes arrangements to have the computer 5 transported 7, to and from, the home 4 where the computer 5 is placed. I envision a user making a request and then receiving an automated machine (a computer) via the mail with instructions on how to work the automated machine or in another example the service provider 2 sending out a technician to set up the computer 5. Once placed in the home 4, the computer 5 will use sensors 6 to acquire data related to the home 4. The sensors are any of a multitude of sensors available on the market. Cameras, speakers, microphones, lasers, motion detection, light, position, and altitude sensors to name a few examples. These sensors 6 generally take physical data and convert them to digital data that is understood by a computer. The computer 5 processes the data so it can be presented on a display 3 for analysis. The display 5 can be some sort of hardware for viewing like a computer display, TV or the like.

Figure 2:
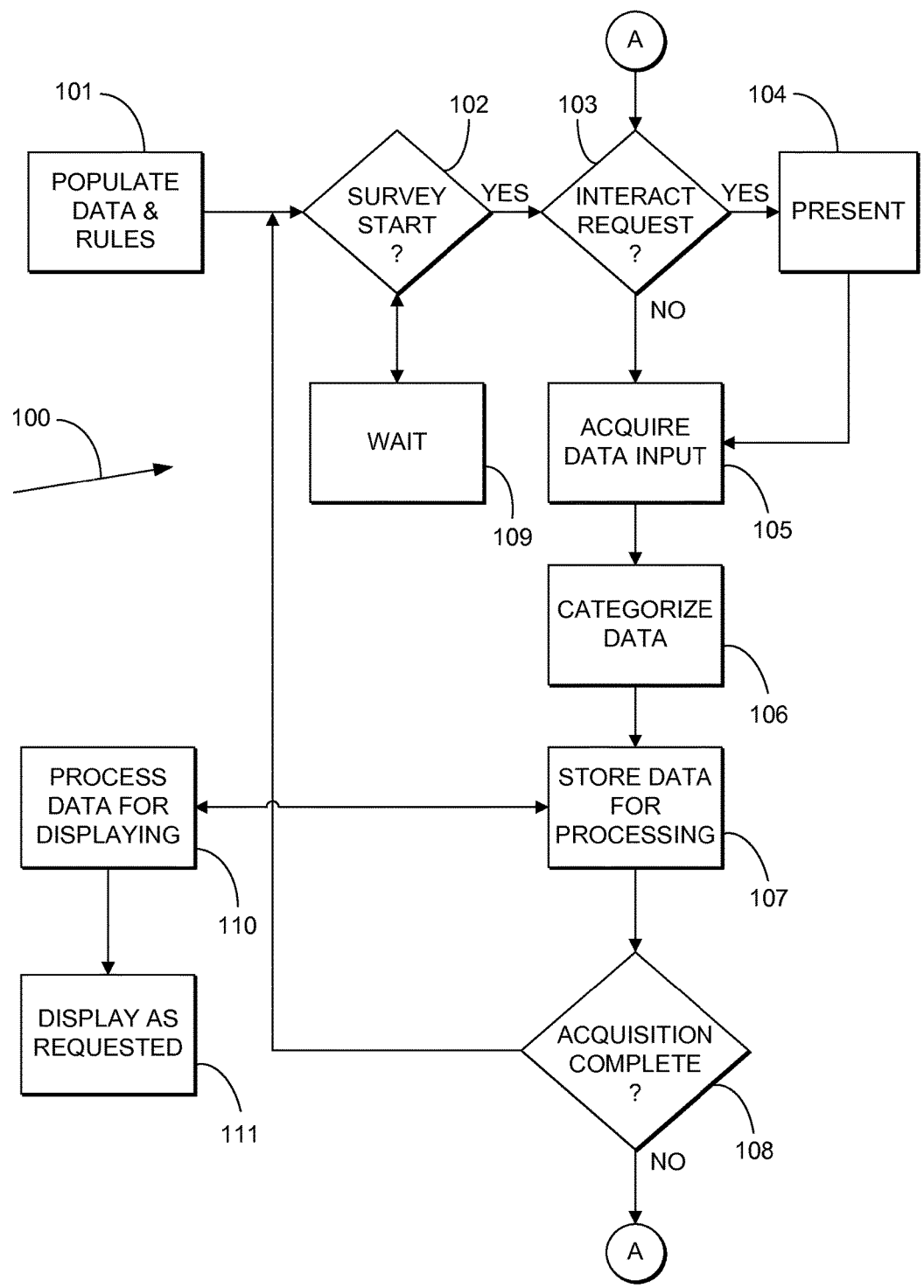
FIG. 2 shows a block diagram of the automated machine processing used to survey real property.

As shown in FIG. 2, a block diagram of the automated machine processing used to survey real property comprises populating the automated machine's software 100 with data and rules related to a real property specimen 101. This programming is best done by a service provider that will provide the automated machine to the person requesting the machine. The programming can be done in a multitude of ways for programming machines and I envision this being done by a service provider, whether human or automated, populating software loaded on the automated machine with data that is suited to the user and the real property specimen. The automated machine awaits for a survey to start 102 and 109. The survey is a process whereby the automated machine is moving throughout the real property specimen on its own or with some assistance from a human. The moving may be along a random or predetermined route. As it moves throughout the real property specimen the automated machine's sensors are used to collect data related to the specimen. The survey can be carried out by the automated machine continuously without taking a break other than to recharge, unlike a human being. Once the survey starts the software will determine whether there has been any request for interaction 103, such as a user requesting to answer any questions stored in the database of the software 100. If there is no request then the machine, a robot for instance, will begin to move throughout the property specimen and acquire data through its various sensors 105. If it finds that there is a request for interaction 103 then the machine will present a question, or other response needing data, to the user 104 and acquire the response 105. Thereafter the software will categorize the data 106 acquired 105 according to the data and rules 101, photos from camera sensors or audio from sound sensors can be stored in database cells that accept graphic or audio files as a data type, or numbers representing distance from mechanical sensors can be stored in database fields that accept numerical data to name a few examples. The software programmed to accept the various input data and place the data into database fields. The machine will store the data it has acquired 105 or categorized 106 for storing and processing 107. If the automated machine determines that the acquisition is complete 108 then it will await another survey to start 102 and 109 if not then it will continue acquiring data 103. The data acquired 105, categorized 106, and stored 107 is now available to be processed, converted from the raw data collected to a user recognizable form, for displaying 110 in a format that is readily analyzed by a user and can be displayed at the user's request 111. The conversion of data stored on the automated machine results in data in the forms of, for example, alpha numeric characters, pictures, graphs, videos, or audio, and the like. The intention being to convert the acquired data into an informative and rich multimedia presentation of the property that portrays the characteristic of the real property specimen.

Figure 3:
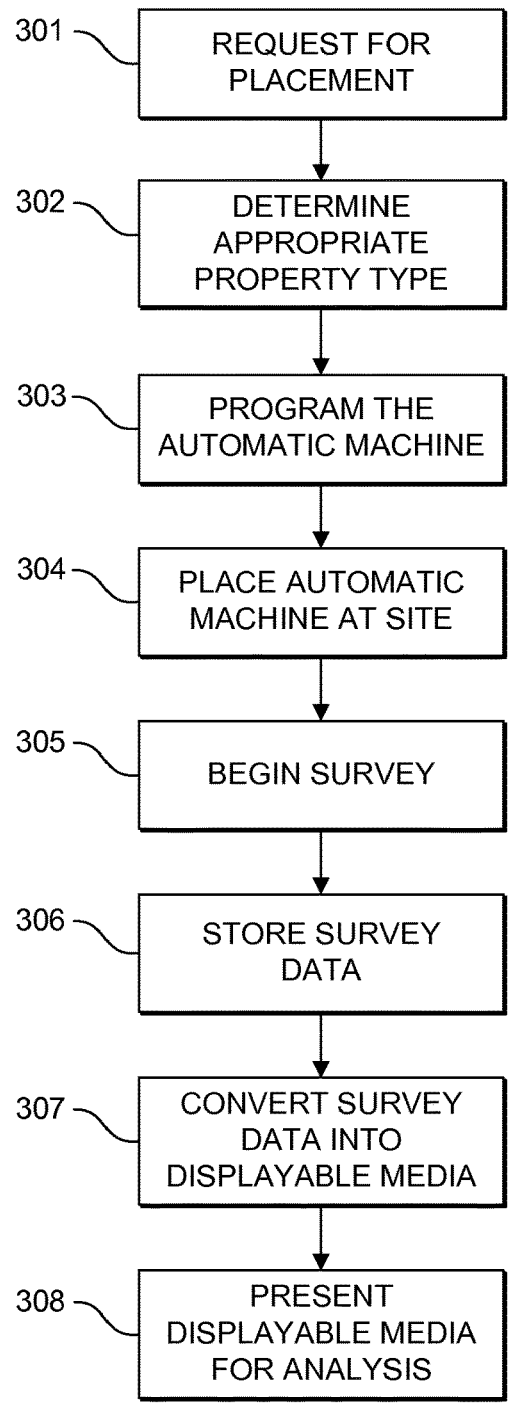
FIG. 3 shows a flowchart of the process of using an automated machine to survey real property.

As shown in FIG. 3, a flowchart of the process of using an automated machine to survey real property, a home or commercial property to name a few examples, comprises a request which can be made over a computer network to name one example, to place the automated machine 301, a robot for instance. Determining and selecting which is the appropriate property type where the automated machine will be placed 302. A property type designation 302 is important because it can be used to determine the type of data that is programmed into and collected by the automated machine. For example, a single story home property type would not collect information related to the number of elevators that might be collected for a multistory commercial property type. Programming the automated machine with the at least one parameter that will allow the automated machine to sufficiently understand a real property specimen to be surveyed 303. The parameter might include the property type, a home for instance, the address, the owner's name, or the location (outside or inside) of the real property specimen. Placing the robot on site at a real property specimen to be surveyed 304. A real property specimen can include all types of real estate, personal property such as trailers, airplanes, boats, mobile homes, truck trailers—generally any property that is to be part of a transaction that would benefit from a thorough survey of its features. Beginning the survey and letting the survey run until it is determined that there is no longer a need to survey the real property 305. Storing the data that the automated machine collects from the survey 306. Storing of the data can be done any number of ways including storing the data on magnetic media, remotely, or in the internet cloud to name a few examples. Converting the survey data into at least one displayable media 307. Presenting the at least one displayable media to one or more users for analysis and manipulation 308. I envision the best way for a user to analyze the data would be via a workstation computer having a display monitor or television screen but there any number of ways for presenting the displayable media to a user.

Although the present invention has been described in considerable detail with the reference to certain preferred versions thereof, other versions are possible. For example, the automated machine can have a multitude of software installed on it to facilitate the survey contemplated, the user can make requests for surveys by means not yet known but which utilize various modes of communicating. Therefore, the spirit and scope of the appended claims should not be limited to the description of the preferred versions contained herein.

Any element in a claim that does not explicitly state "means for" performing a specified function, or "step for" performing a specific function, is not to be interpreted as a "means" or "step" clause as specified in 35 U.S.C. § 112, ¶6. In particular, the use of "step of" in the claims herein is not intended to invoke the provisions of 35 U.S.C. § 112, ¶6.

What I claim is:

1. A process of using an automated machine to survey real property, the real property being the subject of a real property transaction, the process comprising the steps of:
   a user making a request to a service provider for a placement of an automated machine to perform a survey within the real property;
   the service provider receiving from the user a set of data describing the real property;
   the service provider selecting a property type that applies to the real property as described in the set of data describing the real property;
   the service provider programming the automated machine with at least one parameter related to the property type selected;
   the service provider arranging to have the automated machine transported to the real property and then the user receiving the automated machine having instructions for operating the automated machine and the user placing the automated machine into the real property;
   the automated machine performing a survey of the real property by the automated machine moving throughout the real property;
   the automated machine acquiring surveyed data related to the real property via a plurality of sensors, the plurality of sensors providing input to the automated machine;
   the automated machine recording the surveyed data that is input to the automated machine by the plurality of sensors;
   the automated machine processing the surveyed data such that the surveyed data is capable of being presented onto a display.

2. The method of claim 1 wherein making a request to a service provider for a placement further comprises making said request over an interconnected communication network.

3. The method of claim 1 wherein the property type is selected from the group consisting of single-family residence, multi-family residence, commercial building, trailer, mobile home, boat, airplane, rental, bank owned property, vacant lot, and new construction.

4. The method of claim 1 wherein the at least one parameter is selected from the group consisting of GPS coordinates, floorplan, survey plat, owner name, address, telephone number, reference number, primary key, foreign key, route ID, hours and email.

5. The method of claim 1 wherein the at least one parameter and the surveyed data are programmatically compared by the automated machine to determine if any surveyed data requires obtaining further data from the user.

6. The method of claim 1 wherein the automated machine has capability of determining from the at least one parameter related to the property type whether an item encountered during the survey requires a question be answered by the user.

7. The method of claim 1 wherein moving throughout the real property includes following a randomly determined route.

8. The method of claim 1 wherein moving throughout the real property includes following a pre-determined route.

9. The method of claim 1 wherein the plurality of sensors includes a camera.

10. The method of claim 1 wherein the plurality of sensors includes a microphone.

11. The method of claim 1 wherein the plurality of sensors includes a gyroscope.

12. The method of claim 1 wherein the plurality of sensors includes a range-finder.

13. The method of claim 1 wherein the plurality of sensors includes a distance finder.

14. The method of claim 1 wherein the plurality of sensors includes a movement detector.

15. The method of claim 1 wherein the surveyed data includes interior space dimensions.

16. The method of claim 1 wherein the surveyed data includes architectural features.

17. The method of claim 1 wherein the surveyed data includes measurable physical characteristics of the real property specimen.

18. A process of using an automated machine to survey real property, the real property being the subject of a real property sales transaction, the process comprising the steps of:

- a user making a request to a service provider, over an interconnected communication network, for a placement of an automated machine to perform a survey within the real property;
- the service provider receiving from the user a set of data describing the real property;
- the service provider selecting a property type that applies to the real property as described in the set of data describing the real property;
- the property type being selected from the group consisting of single-family residence, multi-family residence, commercial building, trailer, mobile home, boat, airplane, rental, bank owned property, vacant lot, and new construction;
- the service provider programming the automated machine with at least one parameter related to the property type selected;
- the at least one parameter being selected from the group consisting of GPS coordinates, floorplan, survey plat, owner name, address, telephone number, reference number, primary key, foreign key, route ID, hours and email;
- the service provider arranging to have the automated machine transported to the real property and then the user receiving the automated machine having instructions for operating the automated machine and the user placing the automated machine into the real property;
- the automated machine performing a survey of the real property by the automated machine moving throughout the real property following a randomly determined route;
- the automated machine acquiring surveyed data related to the real property via a plurality of sensors, the plurality of sensors providing input to the automated machine;
- the automated machine recording the surveyed data that is input to the automated machine by the plurality of sensors;
- the automated machine processing the surveyed data such that the surveyed data is capable of being presented onto a display.

* * * * *